United States Patent
Yamamoto (10) Patent No.: US 8,179,297 B2
(45) Date of Patent: May 15, 2012

(54) REMOTE CONTROL DEVICE

(75) Inventor: Takahiro Yamamoto, Tokyo (JP)

(73) Assignee: Lapis Semiconductor Co., Ltd., Tokyo (JP)

( * ) Notice: Subject to any disclaimer, the term of this patent is extended or adjusted under 35 U.S.C. 154(b) by 722 days.

(21) Appl. No.: 12/379,409

(22) Filed: Feb. 20, 2009

(65) Prior Publication Data

US 2009/0237288 A1    Sep. 24, 2009

(30) Foreign Application Priority Data

Mar. 19, 2008 (JP) ................................. 2008-071145

(51) Int. Cl.
*H04L 17/02* (2006.01)
(52) U.S. Cl. ...................................... 341/176
(58) Field of Classification Search .................... 341/176
See application file for complete search history.

(56) References Cited

U.S. PATENT DOCUMENTS

2007/0013775 A1* 1/2007 Shin .............................. 348/114
2007/0299626 A1* 12/2007 Song et al. .................... 702/151

FOREIGN PATENT DOCUMENTS

| JP | 2006-323599 | 11/2006 |
| JP | 2007-251893 | 9/2007 |

* cited by examiner

*Primary Examiner* — Rexford N Barnie
*Assistant Examiner* — Dru Parries
(74) *Attorney, Agent, or Firm* — Rabin & Berdo, P.C.

(57) ABSTRACT

A remote control device which can remotely control drive quantities of apparatuses arranged two-dimensionally and better matches a sense of adjustment of a user with being excellent in usability. The remote control device comprises an acceleration sensor unit including an acceleration sensor to detect three-dimensional acceleration; a specified area determining unit that determines one of the plurality of areas to be a specified area based on detected acceleration of the acceleration sensor unit in a first direction and a second direction different from the first direction in the plane; and a drive quantity determining unit that determines a drive quantity of one of the subject apparatuses placed in the specified area according to a detected acceleration of the acceleration sensor unit in a third direction perpendicular to the plane.

12 Claims, 8 Drawing Sheets

REMOTE CONTROL DEVICE

BACKGROUND OF THE INVENTION

1. Field of the Invention

The present invention relates to a remote control device and particularly to a remote control device for remotely controlling the drive quantities of apparatuses arranged two-dimensionally.

2. Description of the Related Art

Conventionally, operating subject apparatuses such as electrical appliances or various electrical apparatuses with use of a remote controller has been widely performed. For example, it has been proposed that when a remote controller is operated in a three-dimensional space, a particular pattern of motion of the remote controller is recognized, and that an instruction to perform an operation corresponding to that pattern is transmitted to a subject apparatus so as to operate the subject apparatus (refer to, e.g., Japanese Patent Kokai No. 2006-323599 (Patent Document 1), pp. 9-10, FIGS. 6, 7).

Meanwhile, it has been proposed that when a remote controller is operated in a three-dimensional space, via an instruction signal to operate according to whether the motion is quick or slow, a subject apparatus is operated (refer to, e.g., Japanese Patent Kokai No. 2007-251893 (Patent Document 2), p. 13, FIG. 4).

As such, as to remote control of an apparatus with use of a remote controller, various methods have been proposed and widely used. A control method is desirable with which to be able to perform the remote control of various apparatuses easily and freely and which can be used for general purposes.

Further, a remote control device is desirable which can perform not only the remote control of a single subject apparatus but also the control of a subject apparatus constituted by a set of multiple units. Moreover, a remote control device is desirable which enables easy and simple operation better matching a sense of adjustment of a user who uses the remote control device with being excellent in usability.

OBJECTS AND SUMMARY OF THE INVENTION

The present invention was made in view of the above situation, and an object thereof is to provide a remote control device which can remotely control the drive quantities of apparatuses arranged two-dimensionally and which better matches a sense of adjustment of a user with being excellent in usability.

According to the present invention, there is provided a remote control device which remotely controls drive quantities of a plurality of subject apparatuses arranged in a plurality of areas in a plane. The remote control device comprises an acceleration sensor unit including an acceleration sensor to detect three-dimensional acceleration; a specified area determining unit that determines one of the plurality of areas to be a specified area based on detected acceleration of the acceleration sensor unit in a first direction and a second direction different from the first direction in the plane; and a drive quantity determining unit that determines a drive quantity of one of the subject apparatuses placed in the determined area (specified area) according to a detected acceleration of the acceleration sensor unit in a third direction perpendicular to the plane.

According to the present invention, the three-dimensional motion (acceleration) of the acceleration sensor unit having the three-dimensional acceleration sensor incorporated therein is detected. Based on the motion or tilt angle (acceleration) in the first and second directions of the acceleration sensor unit, one (a specified area) of the areas in the plane is determined to change the drive quantity of a subject apparatus in the specified area. Further, the drive quantity of the subject apparatus in the specified area is determined according to acceleration in the third direction. Thus, two different contents of operational instructing, i.e., specifying a subject apparatus and specifying the change quantity (drive quantity) of the apparatus can be executed by one operation. Further, this operation well matches a sense of adjustment of a user and is excellent in followability.

DETAILED DESCRIPTION OF THE PREFERRED EMBODIMENT

Embodiments of a remote control device according to the present invention will be described in detail below with reference to the accompanying drawings.

First Embodiment

Figure 1:
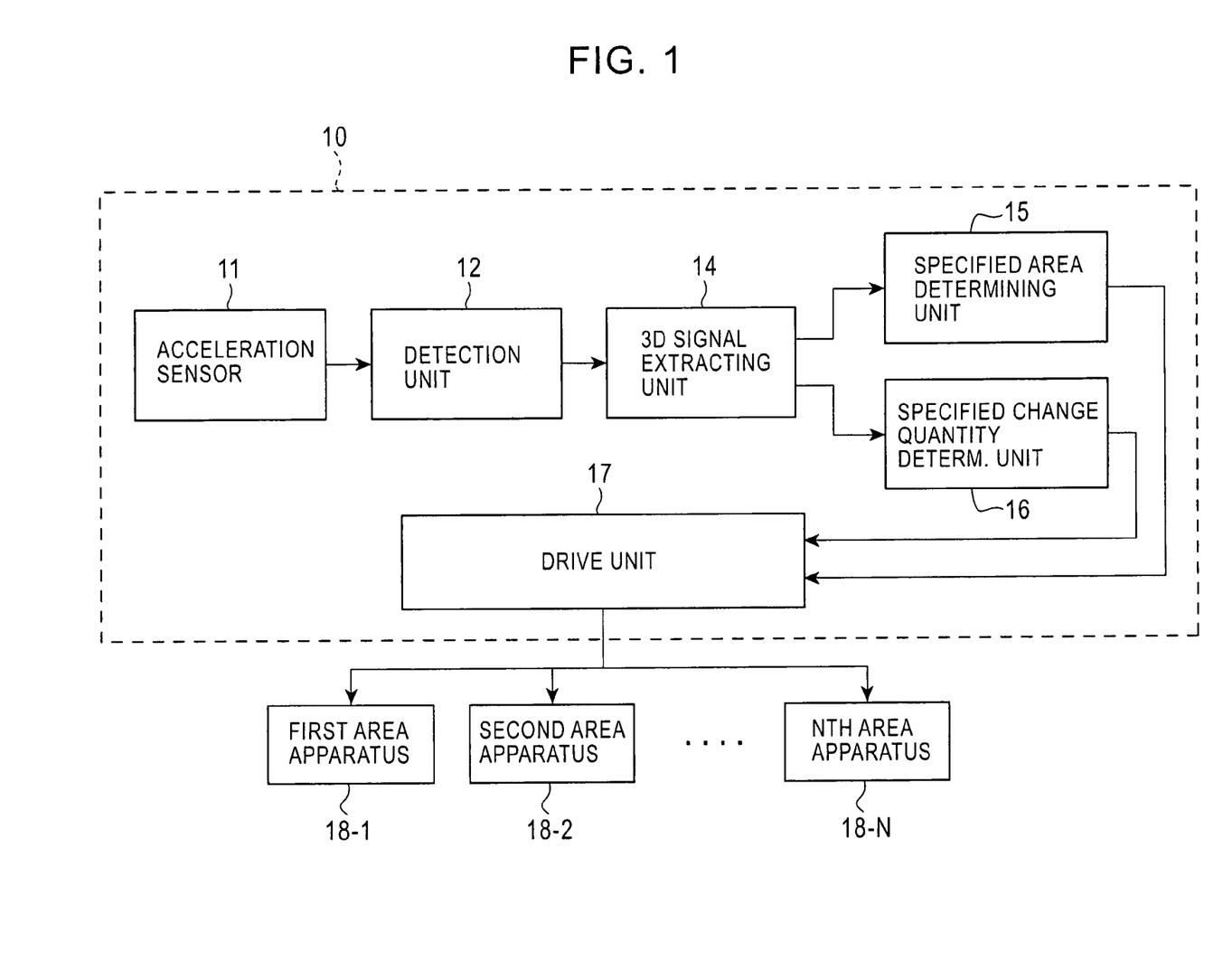
FIG. 1 is a block diagram showing schematically the configuration of a remote control device according to the present invention.

FIG. 1 is a block diagram showing schematically the configuration of a remote control device 10 according to the present invention. The remote control device 10 comprises an acceleration sensor 11, a detection unit 12, a 3D signal extracting unit 14, a specified area determining unit 15, a specified change quantity determining unit 16, and a drive unit 17.

To be more specific, the acceleration sensor 11 is a three-dimensional sensor to sense acceleration including the acceleration of gravity. The remote control device 10 comprises a remote control unit (so-called remote controller) and a controlling unit. As will be described later, the acceleration sensor 11 is provided, fixed in the remote control unit and generates a signal corresponding to the acceleration of the remote control unit. Namely, the remote control unit has the acceleration sensor 11 and functions as an acceleration sensor unit. The detection unit 12 detects the acceleration of the remote control unit from the generated signal of the acceleration sensor 11 to generate a detected acceleration signal. Note that the remote control unit does not need to be used as a single entity but may be incorporated as an acceleration sensor unit in another apparatus.

The controlling unit controls the change quantities (drive quantities) of multiple subject apparatuses arranged two-dimensionally (in a plane) and connected to the controlling unit based on the detected acceleration. Specifically, the 3D signal extracting unit 14 extracts acceleration components for three-dimensional axes (X-axis, Y-axis, Z-axis) from the detected acceleration signal of the remote control unit. The specified area determining unit 15 determines one area (specified area) in the plane (consisting of N areas 18-1, 18-2, . . . , 18-N) specified via the motion or tilt angle (acceleration) of the remote control unit. The specified change quantity determining unit 16 determines a change quantity (specified change quantity) specified via the motion of the remote control unit, that is, a change quantity (specified change quantity) for the subject apparatus in the specified area from among the multiple subject apparatuses.

The drive unit 17 adjusts the change quantity (drive quantity) of the subject apparatus in the specified area based on the specified area and the specified change quantity determined by the specified area determining unit 15 and the specified change quantity determining unit 16.

Figure 2:
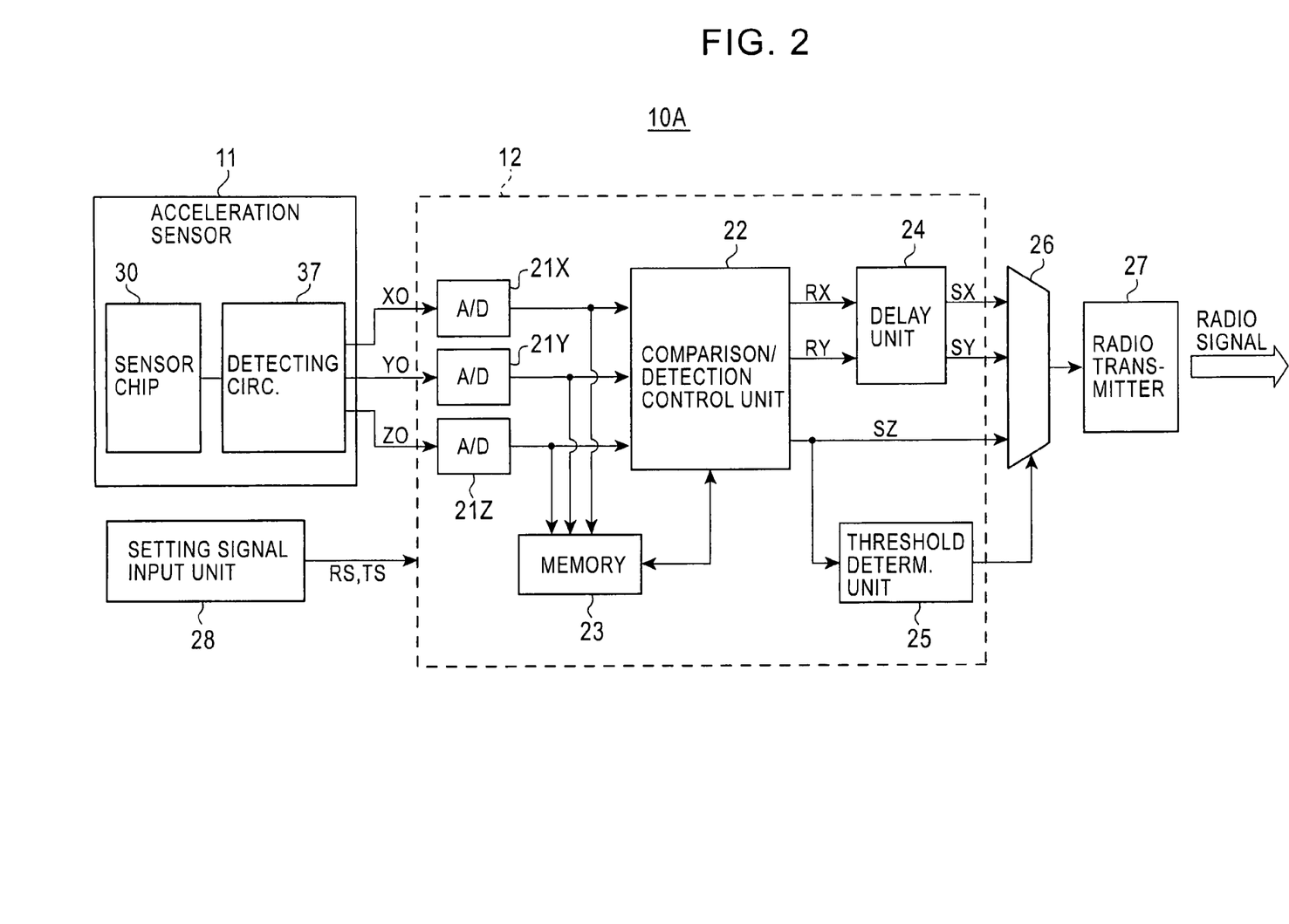
FIG. 2 is a block diagram showing schematically the configuration of a remote control unit.
Figure 3:
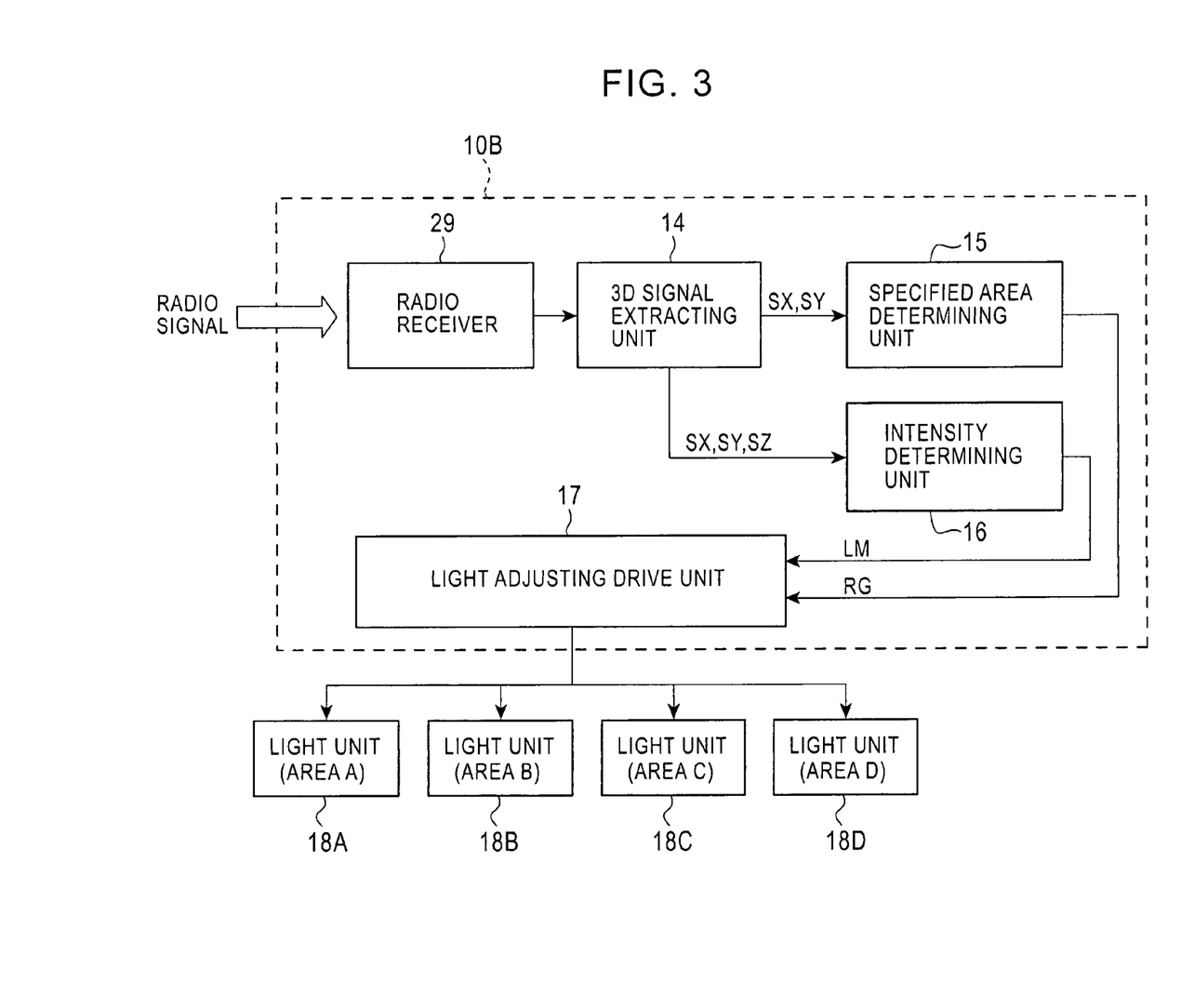
FIG. 3 is a block diagram showing schematically the configuration of a controlling unit that adjusts the illuminance of multiple lighting apparatuses based on a detected signal from the remote control unit of FIG. 2.

The case where the present invention is applied to controlling the illuminance of multiple lighting apparatuses (hereinafter also called light units) arranged in a plane according to the motion of the remote control unit will be described with reference to FIGS. 2 and 3. FIG. 2 is a block diagram showing schematically the configuration of the remote control unit 10A of the remote control device 10. FIG. 3 is a block diagram showing schematically the configuration of the controlling unit 10B, which adjusts the illuminance of multiple lighting apparatuses based on the detected signal supplied from the remote control unit 10A of FIG. 2. Description of the same elements as described above will be simplified or omitted hereinafter.

Figure 4:
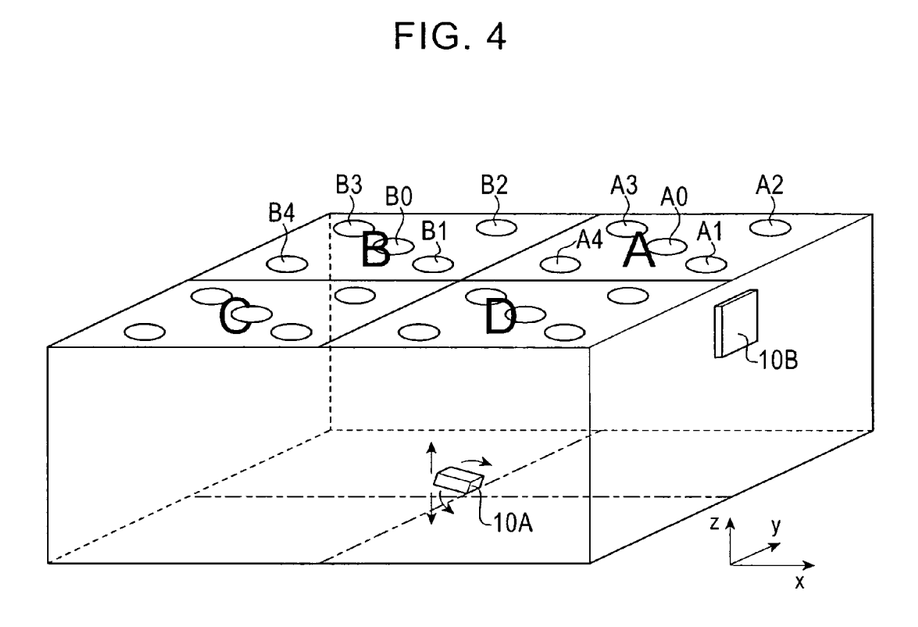
FIG. 4 shows an example of the remote control device for lighting apparatuses according to the present embodiment.

FIG. 4 shows an example of the remote control device for lighting apparatuses according to the present embodiment. In this example, the multiple light units are arranged in four areas A, B, C, D in a plane (e.g., the ceiling of the room) of a three-dimensional space (e.g., a room). The plane (ceiling) is a plane (XY-plane) parallel to an X-direction (first direction) and a second direction (Y-direction) orthogonal to the first direction, and the areas A, B, C, D correspond to first, second, third, and fourth quadrants of the XY-plane respectively. In the area A, a light unit 18A (see FIG. 3) constituted by a set of five lights (e.g., down lights) A0 to A4 is arranged, but not being limited to this, the light unit 18A may be constituted by a light (e.g., A0). The same applies to the configuration of the light units 18B, 18C, 18D in the areas B, C, D.

The remote control unit 10A is located at a position near the center of the three-dimensional space (room) (near the origin of the XY-plane) and away from the plane (ceiling) in a third direction (Z-direction) orthogonal to the plane, for example, near the floor of the room. The controlling unit 10B is provided on, e.g., one plane of the three-dimensional space (e.g., a wall or ceiling of the room). The controlling unit 10B is connected to the remote control unit 10A by radio or wire and to the light units 18A, 18B, 18C, 18D in the areas A, B, C, D and operates to adjust the illuminance of the light units 18A, 18B, 18C, 18D based on the signal from the remote control unit 10A.

Figure 5A:
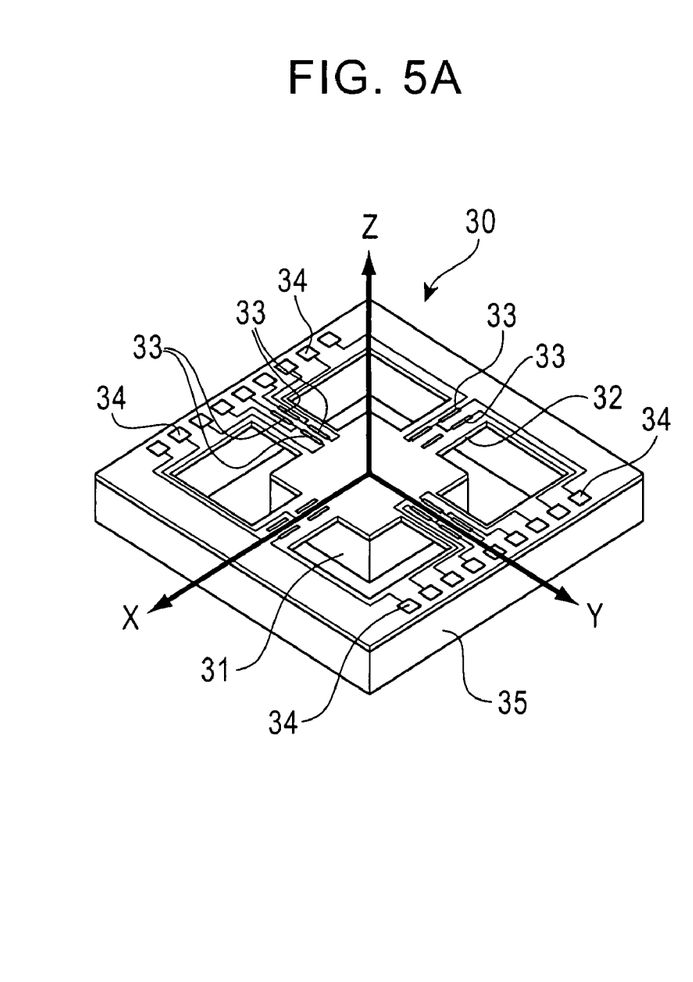
FIGS. 5A and 5B are respectively a perspective view and a sectional view showing schematically the configuration of a piezo-resistance acceleration sensor chip provided in a 3D acceleration sensor.
Figure 5B:
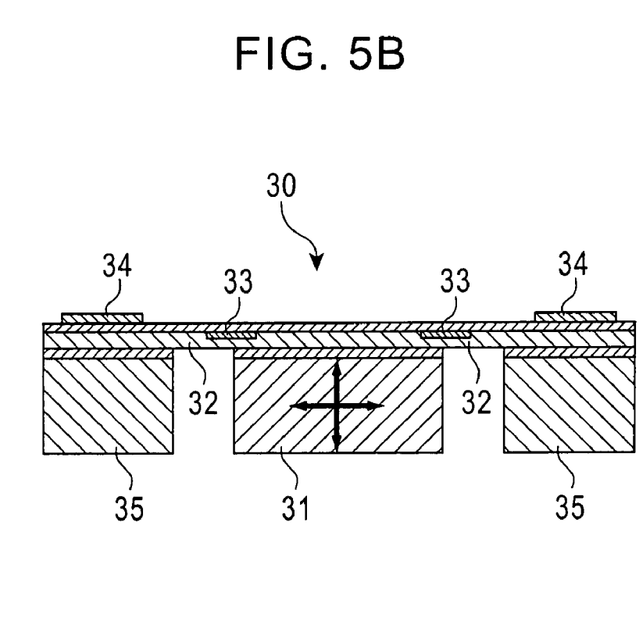

Referring to FIG. 2 again, the acceleration sensor (3D acceleration sensor) 11 that is a three-dimensional sensor is configured to detect acceleration including the acceleration of gravity in the X-, Y-, Z-directions and output detected signals X0, Y0, Z0. FIGS. 5A and 5B are respectively a perspective view and a sectional view showing schematically the configuration of a piezo-resistance acceleration sensor chip 30 provided in the 3D acceleration sensor 11. The sectional view of FIG. 5B shows a cross-section along the YZ-plane (see FIG. 5A) of the acceleration sensor chip 30.

The acceleration sensor chip 30 is formed on a base 35 of, e.g., silicon (Si). The base 35 has four beams 32 formed therein, and a weight 31 supported by the beams 32 is provided in the center of the acceleration sensor chip 30. Piezo-resistance elements 33 are provided on the beams 32, and acceleration is sensed based on change in the resistance of the piezo-resistance elements 33 due to the acceleration applied to the weight 31. More specifically, electrodes 34 are connected to the piezo-resistance elements 33, and change in the resistance of the piezo-resistance elements 33 is detected by a resistance change detecting circuit 37 connected to the electrodes 34. Then, the 3D acceleration sensor 11 outputs the detected signals X0, Y0, Z0 from the resistance change detecting circuit 37. The detected signals X0, Y0, Z0 are respectively converted into digital signals by analog/digital converters (A/D) 21X, 21Y, 21Z provided in the detection unit 12.

Although the case has been described where the acceleration sensor chip 30 is configured to detect acceleration in the first direction (X-direction), the second direction (Y-direction) perpendicular to the first direction, and the third direction (Z-direction) perpendicular to a plane parallel to the first and second directions, not being limited to this, the second direction in the plane does not need to be a direction perpendicular to the first direction, but need only be different from the first direction. Further, the third direction does not need to be a direction perpendicular to the plane, but need only be a direction non-parallel to the plane. Moreover, the 3D acceleration sensor detecting acceleration by a piezo-resistance element has been described in FIGS. 5A and 5B, but the sensor may be a capacitance type, a heat sensing type, or a piezoelectric type of 3D acceleration sensor, or may be a combined sensor of YD or 2D acceleration sensors to function as a 3D acceleration sensor.

The remote control unit 10A is provided with a setting signal input unit 28 for supplying an illuminance adjustment start signal (setting start signal) RS and an illuminance adjustment setting finish signal (setting finish signal) TS to the detection unit 12 in response to user inputs.

The detection unit 12 is provided with a comparison/detection control unit 22 for controlling the detection unit 12 and producing signals RX, RY, RZ (or SZ) described later. The comparison/detection control unit 22 stores the detected values X0, Y0, Z0 of the acceleration sensor 11 at the time that the setting start signal RS is input in a memory 23 in response to the setting start signal RS. The stored detected values are used as reference values (offset values) Xref, Yref, Zref. The comparison/detection control unit 22 compares the detected values Xt, Yt, Zt of the acceleration sensor 11 at time t in the period until the setting finish signal TS is input with the reference values and calculates difference signals RX, RY, RZ corresponding to relative displacement with respect to the position of the remote control unit at the time that the setting start signal RS is input, where RX=Xt−Xref, RY=Yt−Yref, and RZ=Zt−Zref.

The difference signals RX, RY related to the first and second directions are delayed by a predetermined time (DT) by a delay unit 24 and are respectively output as setting signals (i.e., setting values) SX, SY from the delay unit 24. The difference signal RZ related to the third direction is output as it is as a setting signal SZ without being delayed.

The setting signals SX, SY, SZ are supplied to a selector 26 and individually transmitted from a radio transmitter 27.

The setting signal SZ is supplied to a threshold determining unit 25. If the threshold determining unit 25 determines that the setting signal SZ exceeds a predetermined threshold value (TH), the selector 26 does not output the setting signals SX, SY. In this case, the selector 26 outputs only the setting signal SZ. On the other hand, if the threshold determining unit 25 determines that the setting signal SZ is not above the predetermined threshold value TH, the selector 26 outputs the setting signals SX, SY, SZ. This is, as will be described later, for removing SX, SY that are unnecessary where the motion (change in acceleration) of the remote control unit 10A is changed quickly in order to only adjust illuminance according to the output SZ.

Where the motion of the remote control unit 10A is not quick and the setting signal SZ changes slowly as will be described later, the delay unit 24 and the selector 26 do not need to be provided, or the selector 26 may select all the three with the delay time DT in the delay unit 24 set at zero.

Or, in the detection unit 12, the RX, RY, SZ may be calculated according to RX=Xt−Xref, RY=Yt−Yref, and RZ=Zt−Zref, where Xt, Yt, Zt are the detected values of the acceleration sensor 11 at the time that the setting finish signal TS is input. By this means, after the displacement of the remote control unit 10A becomes definite, illuminance adjustment for an adjusted area can be performed.

Referring to FIG. 3 again, the signal transmitted from the radio transmitter 27 of the remote control unit 10A is received by a radio receiver 29 provided in the controlling unit 10B. The 3D signal extracting unit 14 extracts the setting signals SX, SY, SZ (X-, Y-, and Z-direction components of acceleration) from the received signal.

The specified area determining unit 15 determines one specified area of the areas A, B, C, D based on the acceleration (including the acceleration of gravity) in the XY-plane associated with the motion of the remote control unit 10A, namely, determines the specified area based on the setting signals SX, SY. More specifically, the specified area is determined from the orientation in the XY-plane of the remote control unit 10A at time t before the setting finishes with respect to a reference tilt angle of the remote control unit 10A, which corresponds to the reference values Xref, Yref, Zref stored at the illuminace adjustment start, the orientation being an angular difference from the reference tilt angle. For example, where the remote control unit 10A is tilted, directed to the first quadrant (area A) of the four quadrants of the XY-plane, the specified area is determined to be the area A. Then, the specified area determining unit 15 supplies a signal (specified area indicating signal) RG indicating the specified area to the drive unit 17 (light adjusting drive unit 17 in this embodiment).

The specified change quantity determining unit (intensity determining unit) 16 determines illuminance (specified change quantity) for the light unit in the specified area based on acceleration in the Z-direction (setting value SZ) associated with the motion of the remote control unit 10A. For example, the illuminance is determined according to the magnitude of the acceleration or tilt angle in the Z-direction (an angular difference from the reference tilt angle) of the remote control unit 10A. Then, the specified change quantity determining unit 16 supplies a signal (specified change quantity indicating signal) LM indicating the illuminance to the light adjusting drive unit 17. The signal LM output from the specified change quantity determining unit 16 may be adjusted to indicate illuminance values respectively corresponding to multiple thresholds set within a range of, e.g., ±45 degrees for each axis. This is because, assuming that a person holding the remote control unit 10A displaces the remote control unit 10A within a range in which the wrist is easily movable, it is thought that the remote control unit 10A will be moved within a range of about ±45 degrees relative to the position where it is held naturally, in spite of personal differences, and accordingly, by making adjustment within the wrist-movable range without using all angles, the amount of computation can be reduced with eliminating the possibility that the user is forced to displace further. Where values corresponding to displacements within this range are output as they are, the signal LM may be output to adjust illuminance in response to a slight vibration, but the problem that illuminance may be changed in response to a slight vibration can be solved by setting the values of the signal LM to be stepwise for within the wrist-movable range so as to set multiple thresholds and arranging such that, when the SZ is within thresholds, the signal LM of corresponding intensity is output.

The light adjusting drive unit 17 adjusts the illuminance of a light unit based on the specified area indicating signal RG and the specified change quantity indicating signal LM. For example, when the specified area is the area A, the drive unit 17 performs illuminance adjustment such that the larger the tilt angle is, the greater the illuminance of the light unit 18A is.

Figure 6:
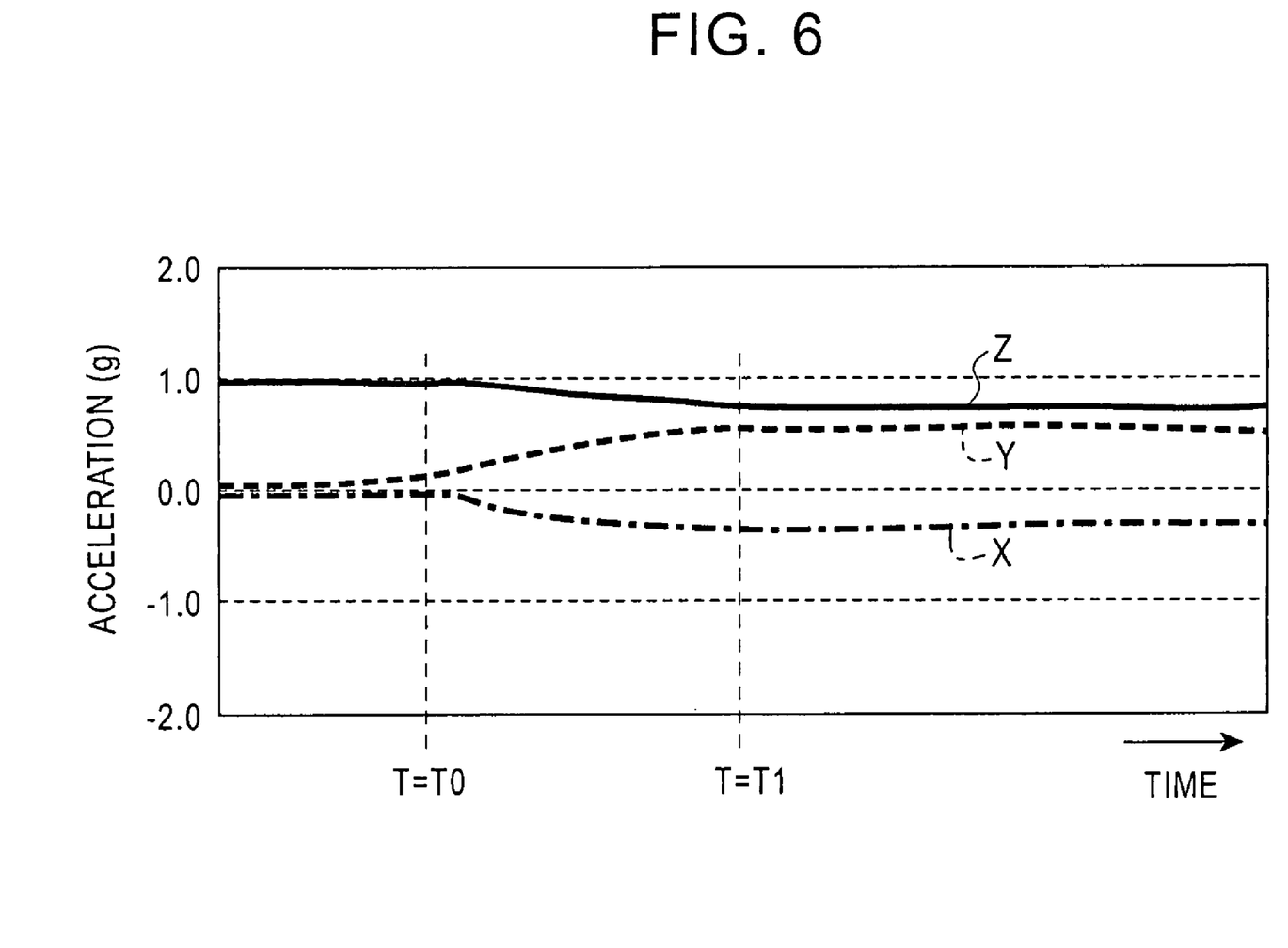
FIG. 6 shows changes in detected signals (X, Y, Z) of the acceleration sensor when the remote control unit is slowly tilted in a three-dimensional space.

Next, the operation of the remote control device 10 having the above configuration will be described more specifically with reference to the drawings. FIG. 6 shows changes in the detected signals (X, Y, Z) of the acceleration sensor 11 when the remote control unit 10A is slowly tilted in a three-dimensional space. In FIG. 6, the detected signal of the X-direction is indicated by the dot-dashed line, the detected signal of the Y-direction by the broken line, and the detected signal of the Z-direction by the solid line. As shown, the detected signals denote changes in the tilt angle of the remote control unit 10A in the X-, Y-, Z-directions over time when the remote control unit 10A is moved slowly such that variation in acceleration except change in the acceleration of gravity due to the tilting of the remote control unit 10A is smaller than a predetermined value, or the remote control unit 10A is moved at constant speed.

FIG. 6 shows the case where at time T=T0 setting is started by an input switch (not shown) of the remote control unit 10A, and where at time T=T1 the setting is finished. Namely, at time T=T0 the reference values Xref, Yref, Zref are stored, and at time t, where T0<t<T1, differences RX, RY, RZ of the detected values of the acceleration sensor 11 from the stored reference values are calculated. As described above, in this case, the difference signals RX, RY do not need to be delayed but can be used as they are as the setting signals SX, SY. When the difference signals are used as above, the remote control unit 10A does not need to be placed horizontally at the illuminance control start. The tilt of the remote control unit 10A at the illuminance control start is set as an initial position, and using the tilt angle displacements (ΔX, ΔY, ΔZ) of the remote control unit 10A in the X-, Y-, Z-directions with respect to that position, the illuminance control can be performed. That is, specifying an adjusted area by the tilt angle displacements in the X- and Y-directions and specifying illuminance by the tilt angle displacement in the Z-direction can be performed in a manner which better matches a sense of adjustment of a user and is excellent in follow-ability.

Meanwhile, the application where the remote control unit 10A is rapidly moved so as to change illuminance greatly or quickly is also possible. Or, the invention can be applied so as to avoid a malfunction when the remote control unit 10A is rapidly moved.

Figure 7:
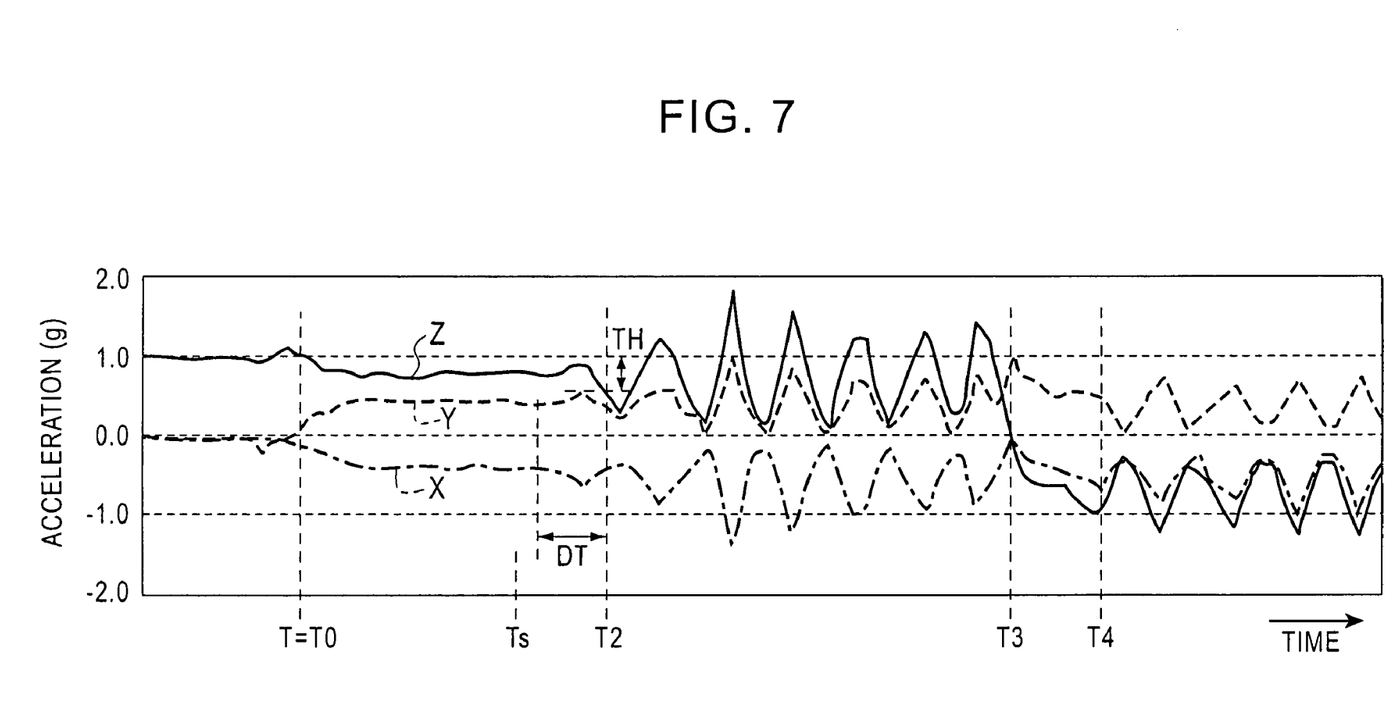
FIG. 7 shows changes in the detected signals (X, Y, Z) of the acceleration sensor when the remote control unit is swung substantially in a Z-direction.

FIG. 7 shows changes in the detected signals (X, Y, Z) of the acceleration sensor 11 when the remote control unit 10A is swung substantially in the Z-direction at time T=Ts. After time T=Ts the detected signals (X, Y, Z) change greatly. When the detected signal of the Z-direction exceeds a predetermined threshold value (TH) (time T=T2), it cannot be said that the detected signals of the X- and Y-directions at this point are accurate enough to specify an adjusted area. Accordingly, the delay unit 24 is provided to delay the difference signals RX, RY by the predetermined time (DT), and the setting signals (setting values SX, SY) the predetermined time (DT) earlier are used. Namely, when the detected signal of the Z-direction exceeding the threshold value (TH) is detected, the threshold determining unit 25 outputs a signal to the selector 26, and the selector 26 having received the signal does not output SX, SY but outputs SZ only. By this means, specifying an adjusted area can be stopped when the remote control unit 10A is swung substantially in the Z-direction. Moreover, since being output via the delay unit 24, the SX and SY, which may not be accurate when it is swung substantially in the Z-direction, can be prevented from being output until the threshold determining unit 25 outputs the signal indicating the detected signal exceeding the threshold value. Note that the specified area determining unit 15 is set to continue selecting the area previously selected where those signals are not output.

As such, control is made such that when the remote control unit 10A is rapidly moved, illuminance is changed more greatly than when moved slowly (resulting in small variation in acceleration except the acceleration of gravity as shown in FIG. 6). That is, where illuminance adjustment is insufficient, by swinging the remote control unit 10A, control to change illuminance greatly can be performed. That is, the intensity determining unit 16 detects variation in acceleration in the Z-direction (setting value SZ) and supplies the illuminance indicating signal (specified change quantity indicating signal) LM to more greatly change illuminance (light intensity) to the light adjusting drive unit 17.

In this case, the illuminance adjustment operation mode of light units can be switched according to values of time during which the detected signal of the Z-direction exceeds the predetermined threshold value (TH), the amplitude of the detected signal of the Z-direction, the area of the vibration waveform, and the like. That is, it can be arranged that when the magnitude of variation in the detected signal of the Z-direction is equal to or less than a predetermined value, fine adjustment of illuminance is performed (a fine adjustment mode), and that when the magnitude of variation exceeds the predetermined value, coarse adjustment of illuminance is performed (a coarse adjustment mode). In another control method, it may be arranged that the SZ is not output while specifying an adjusted area, and that when the remote control unit 10A is swung, adjustment of illuminance is performed.

FIG. 7 shows that at time T, where T3≦T≦T4, the remote control unit 10A is turned upside down, and at time T, where T>T4, the remote control unit 10A upside down is swung. In this case, the sign of acceleration in the Z-direction is inverted, and the intensity determining unit 16 supplies the illuminance indicating signal LM to change the illuminance of the light unit in the specified area differently from the above case to the light adjusting drive unit 17. For example, the illuminance indicating signal LM to decrease the illuminance may be supplied to the light adjusting drive unit 17, in which case control to decrease or increase the illuminance depending on whether the remote control unit 10A is turned upside down or not can be performed. That is, switching can be made between increasing and decreasing the illuminance depending on the polarity of detected acceleration in the Z-direction of the remote control unit 10A.

Further, there may occur a case where the remote control unit 10A is dropped or the like. In case this happens, acceleration when dropping may be set as a threshold in the threshold determining unit 25, and, for example, control to stop the selector 26 from outputting when detecting acceleration associated with dropping can be performed. With this control, the remote control device can be configured to prevent the area determining unit 15 and the intensity determining unit 16 from operating accordingly when the remote control unit 10A is dropped.

As such, according to the present invention, one (a specified area) of multiple areas in a plane (XY-plane) is specified based on the motion or tilt angle (acceleration) in the plane of the remote control unit 10A (an acceleration sensor unit) having the three-dimensional acceleration sensor incorporated therein, and the drive quantity of the subject apparatus (light unit) in the specified area is specified based on the motion or tilt angle (acceleration) in the third direction (Z-direction). That is, two different contents of operational instructing, i.e., specifying a subject apparatus and specifying the change quantity (drive quantity) of the apparatus can be executed by one operation to move or tilt the remote control unit 10A. Further, this operation well matches a sense of adjustment of a user and is excellent in followability.

Figure 8:
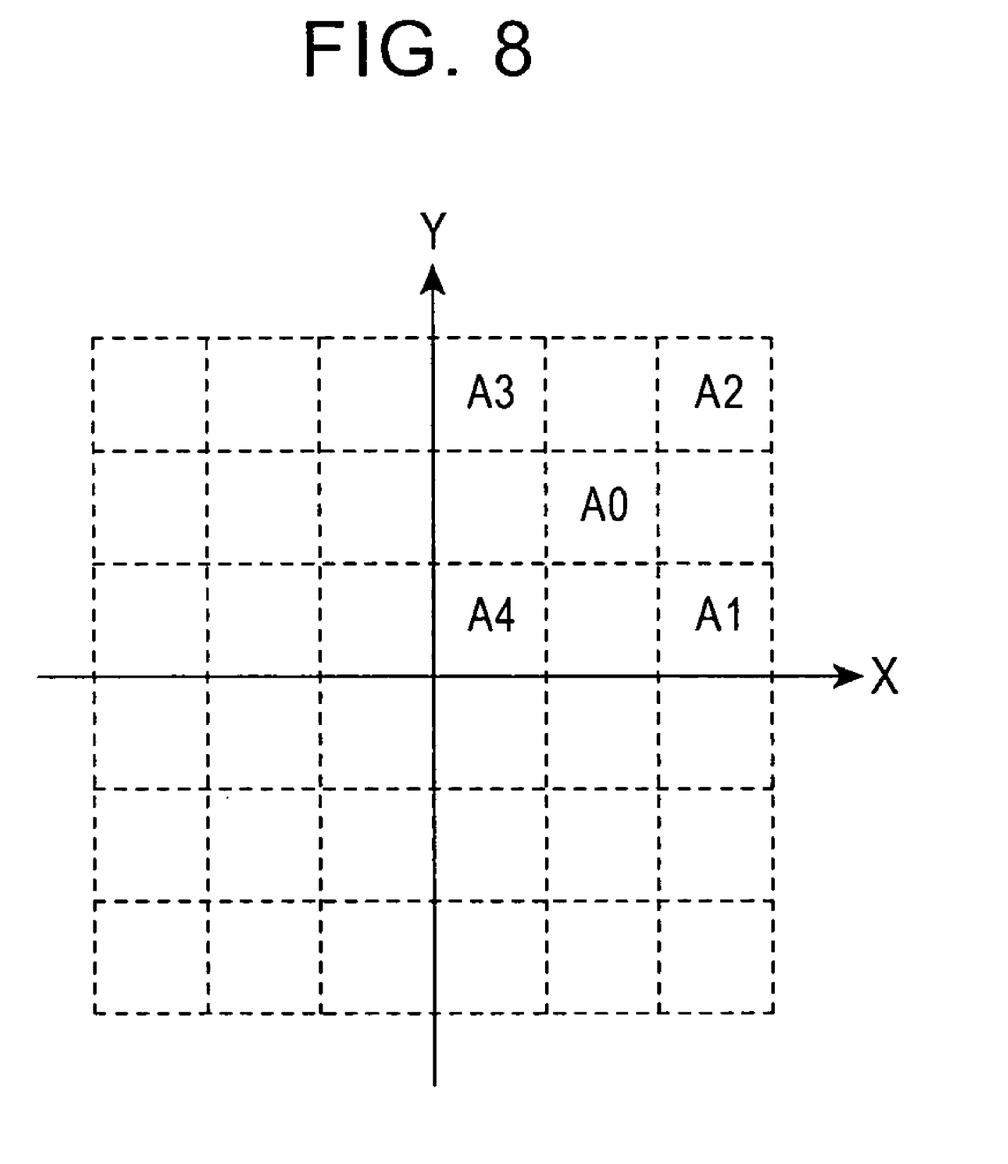
FIG. 8 is a diagram for explaining a variant of the present embodiment.

FIG. 8 is a diagram for explaining a variant of the present embodiment. In the above embodiment, the case where the specified area determining unit 15 determines one of the first to fourth quadrants (areas A to D) of the XY-plane has been described, but the invention is not limited to this. Various applications are possible. For example, the invention can be applied to the case where the above areas are further divided.

As shown in FIG. 8, the case where a set of five lights A0 to A5 (a light unit 18A) are arranged in the area A will be described. For example, when the specified area determining unit 15 determines the specified area to be the area A, the specified area determining unit 15 may further determine a specified direction in the XY-plane based on the setting signals SX, SY. Namely, it may determine one of the X-direction for lights A4 and A1, the Y-direction for lights A4 and A3, and a middle direction for lights A4, A0, and A2. If determining the specified direction to be the middle direction, for example, the specified area determining unit 15 may supply a signal (specified direction indicating signal) RG indicating the specified direction to the light adjusting drive unit 17 to adjust the illuminance of the lights A4, A0, and A2 in the specified direction.

In the above embodiment, the case where the illuminance of multiple lighting apparatuses arranged in a plane is controlled according to the acceleration or tilt angle of the remote control unit 10A has been described, but not being limited to this, the invention can be generally applied to multiple apparatuses arranged in a plane. For example, the invention can be applied to multiple audio apparatuses such as speakers, or displays arranged in a plane. In the case of applying the invention to audio apparatuses (speakers), for example, as to controlled variables, the sound quality as well as the volume may be adjusted. In the case of applying the invention to displays, the controlled variables may be various adjustable quantities such as brightness, contrast, and chromaticity of multiple areas in the display screen. For example, for a multi-display wherein multiple sub-screens exist in the screen of a display apparatus, the invention can be applied to image-quality adjustment of brightness, contrast, chromaticity, and the like of each sub-screen.

The configuration of each of the remote control unit 10A and the controlling unit 10B is limited to the above one. For example, the remote control unit may be configured to include any or all of the detection unit 12, the 3D signal extracting unit 14, the specified area determining unit 15, and the specified change quantity determining unit 16 from among the elements of the controlling unit 10B of the above embodiment. Further, the remote control unit and the controlling unit may be configured to transmit and receive signals by wire or via a network, not being limited to by radio.

The remote control unit 10A does not need to be provided as a separate entity, but may be incorporated in another apparatus. For example, the configuration of the remote control unit 10A may be incorporated in an apparatus such as a musical instrument, and in a place such as a performance stage, the volume and sound quality of audio apparatuses such as speakers and the illuminance of lighting apparatuses may be adjusted according to the motion or tilt angle of the musical instrument.

This application is based on Japanese patent application No. 2003-208378 which is hereby incorporated by reference.

What is claimed is:

1. A remote control device which remotely controls drive quantities of a plurality of subject apparatuses arranged in a plurality of areas in a plane, comprising:
    an acceleration sensor unit including an acceleration sensor to detect three-dimensional acceleration;
    a specified area determining unit that determines one of said plurality of areas to be a specified area based on detected acceleration of said acceleration sensor unit in a first direction and a second direction different from said first direction in said plane; and
    a drive quantity determining unit that determines a drive quantity of one of said subject apparatuses placed in said specified area according to a detected acceleration of said acceleration sensor unit in a third direction perpendicular to said plane.

2. A remote control device according to claim 1, further comprising:
    a detection control unit that determines reference acceleration in said first to third directions of said acceleration sensor unit,
    wherein said specified area determining unit and said drive quantity determining unit respectively determine said specified area and said drive quantity based on acceleration difference from said reference acceleration.

3. A remote control device according to claim 1, further comprising:
    a threshold determining unit that determines whether the detected acceleration in said third direction of said acceleration sensor unit exceeds a predetermined threshold value,
    wherein when it is determined that said detected acceleration exceeds said predetermined threshold value, said specified area determining unit determines said specified area based on detected acceleration in said first direction and second direction a predetermined time earlier.

4. A remote control device according to claim 1, wherein said detected acceleration is a tilt angle of said acceleration sensor unit.

5. A remote control device according to claim 1, wherein when variation in the detected acceleration in said third direction of said acceleration sensor unit exceeds a predetermined value, said drive quantity determining unit performs coarse adjustment of said drive quantity.

6. A remote control device according to claim 1, wherein said drive quantity determining unit switches between increasing and decreasing said drive quantity depending on polarity of the detected acceleration in said third direction of said acceleration sensor unit.

7. A remote control device which remotely controls drive quantities of a plurality of subject apparatuses arranged in a plurality of areas in a plane, comprising:
    an acceleration sensor unit including an acceleration sensor to detect three-dimensional acceleration;
    specified area determining means for determining one of said plurality of areas to be a specified area based on detected acceleration of said acceleration sensor unit in a first direction and a second direction different from said first direction in said plane; and
    drive quantity determining means for determining a drive quantity of one of said subject apparatuses placed in said specified area according to a detected acceleration of said acceleration sensor unit in a third direction perpendicular to said plane.

8. A remote control device according to claim 7, further comprising:
    detection control means for determining reference acceleration in said first to third directions of said acceleration sensor unit,
    wherein said specified area determining means and said drive quantity determining means respectively determine said specified area and said drive quantity based on acceleration difference from said reference acceleration.

9. A remote control device according to claim 7, further comprising:
    threshold determining means for determining whether the detected acceleration in said third direction of said acceleration sensor unit exceeds a predetermined threshold value,
    wherein when it is determined that said detected acceleration exceeds said predetermined threshold value, said specified area determining means determines said specified area based on detected acceleration in said first direction and second direction a predetermined time earlier.

10. A remote control device according to claim 7, wherein said detected acceleration is a tilt angle of said acceleration sensor unit.

11. A remote control device according to claim 7, wherein when variation in the detected acceleration in said third direction of said acceleration sensor unit exceeds a predetermined value, said drive quantity determining means performs coarse adjustment of said drive quantity.

12. A remote control device according to claim 7, wherein said drive quantity determining means switches between increasing and decreasing said drive quantity depending on polarity of the detected acceleration in said third direction of said acceleration sensor unit.

* * * * *